United States Patent [19]

Falt et al.

[11] Patent Number: 5,363,457
[45] Date of Patent: Nov. 8, 1994

[54] OPTICAL PHASE-MODULATING DEVICES AND METHODS FOR THEIR OPERATION

[75] Inventors: Christopher E. Falt; Bruce A. Richardson, both of Nepean; Claude Rolland, Ottawa, all of Canada

[73] Assignee: Northern Telecom Limited, Montreal, Canada

[21] Appl. No.: 91,708

[22] Filed: Jul. 15, 1993

[51] Int. Cl.⁵ .......................................... G02B 26/06
[52] U.S. Cl. .......................................... 385/3; 385/14; 385/2
[58] Field of Search .......................... 385/1–4, 385/8, 14, 40, 9

[56] References Cited

U.S. PATENT DOCUMENTS

| | | | |
|---|---|---|---|
| 4,291,939 | 9/1981 | Giallorenzi et al. | 385/9 |
| 4,683,448 | 7/1987 | Duchet et al. | 332/7.51 |
| 4,763,974 | 8/1988 | Thaniyavarn | 350/96.14 |
| 4,793,677 | 12/1988 | Adams et al. | 350/96.14 |
| 4,878,723 | 11/1989 | Chen et al. | 350/96.14 |
| 5,090,790 | 2/1992 | Zucker | 385/8 X |
| 5,101,450 | 3/1992 | Olshansky | 385/3 |
| 5,119,449 | 6/1992 | Komatsu et al. | 385/8 |
| 5,157,744 | 10/1992 | Korotky | 385/2 |
| 5,239,401 | 8/1993 | Olshansky | 385/3 |
| 5,249,243 | 9/1993 | Skeie | 385/8 |

OTHER PUBLICATIONS

"Optimization of Strongly Guiding Semiconductor Rib Waveguide Y–Juntions", Rolland, et al., IEEE Photonics Technology Letters, vol. 2, No. 6, Jun. 1990.

*Primary Examiner*—John D. Lee
*Assistant Examiner*—Phan Thi Heartney
*Attorney, Agent, or Firm*—C. W. Junkin

[57] ABSTRACT

A semiconductor-based optical phase-modulating device has first and second pairs of phase-fixing electrodes bracketing a pair of phase-modulating electrodes. The phase-fixing electrodes fix electric fields across end regions of the phase-modulating device to reduce distributed resistance and capacitance of the phase-modulating device, thereby improving the frequency response of the phase-modulating device. The optical phase-modulating device is particularly applicable to use in integrated optic Mach-Zehnder interferometers used for optical signal modulation.

15 Claims, 5 Drawing Sheets

OPTICAL PHASE-MODULATING DEVICES AND METHODS FOR THEIR OPERATION

FIELD OF THE INVENTION

This invention relates to optical phase-modulating devices and to methods for their operation. It is particularly relevant to semiconductor-based integrated optic devices, including Mach-Zehnder interferometers.

BACKGROUND OF THE INVENTION

A known semiconductor-based optical phase-modulating device comprises a plurality of semiconductor layers defining an optical waveguide section, and a pair of phase-modulating electrodes on opposite sides of the waveguide section. A time-varying electric signal is applied to the phase-modulating electrodes to apply an electric field across the waveguide section. The electric field modulates refractive indices of the semiconductor layers, thereby modulating the effective optical path length through the waveguide section and the resulting phase of the optical signal at an output end of the waveguide section.

Such known optical phase-modulating devices can be used in the construction of integrated optic devices. For example, an integrated optic Mach-Zehnder interferometer can be constructed from two such optical phase-modulating devices connected between a waveguide splitter and a waveguide combiner. An optical signal is split into two components by the waveguide splitter, each component is passed through a respective phase-modulating device, and the phase-modulated signals are recombined by the waveguide combiner to produce a recombined signal. By applying different electric signals to the phase-modulating electrodes of the two phase-modulating devices, the relative phase of the optical signal components is modulated resulting in intensity modulation of the recombined signal.

The semiconductor layers which define the optical waveguide section have a finite resistance. Consequently, electric signals applied to the phase-modulating electrodes spread along the semiconductor layers beyond ends of the phase-modulating electrodes. The distributed resistance and capacitance of the semiconductor layers act as a distributed RC network, so that the phase-modulation provided by the phase-modulation device has an undesirable frequency dependence. In Mach-Zehnder interferometers constructed from such phase-modulating devices, the frequency dependence of phase-modulation results in frequency dependence of the modulation depth of the recombined signal.

SUMMARY OF THE INVENTION

This invention provides semiconductor-based optical phase-modulating devices and methods for operating semiconductor-based optical phase-modulating devices which permit more accurate control of optical phase shifts and resulting interference signals.

One aspect of the invention provides an optical phase-modulating device. The device comprises a plurality of semiconductor layers defining an optical waveguide section. First and second pairs of phase-fixing electrodes are disposed adjacent first and second parts of the optical waveguide section respectively for fixing electric fields in a predetermined direction across the first and second parts of the optical waveguide section to fix effective optical path lengths through the first and second parts of the optical waveguide section. The first and second parts of the optical waveguide section are longitudinally spaced along the optical waveguide section. A pair of phase-modulating electrodes is disposed adjacent a third part of the optical waveguide section for applying a variable electric field in a predetermined direction across the third part of the optical waveguide section to vary an effective optical path length through the third part of the optical waveguide section. The third part of the optical waveguide section is disposed between the first and second parts of the optical waveguide section.

The fixation of electric fields across the first and second parts of the waveguide section by the phase-fixing electrodes limits the spread of the variable electric field along the semiconductor layers to reduce the distributed resistance and capacitance of the phase-modulating device thereby providing better high frequency response. The phase-fixing electrodes also permit DC biasing of the phase shift provided by the phase-modulating device.

Preferably, at least one electrode of each of the first and second pairs of phase-fixing electrodes is spaced from a respective end of a corresponding electrode of the pair of phase-modulating electrodes by a distance which is much shorter than the corresponding electrode of the pair of phase-modulating electrodes.

The semiconductor layers defining the optical waveguide section may comprise a pair of cladding layers having a cladding refractive index and a core layer having a core refractive index, the core layer being disposed between the cladding layers and the core refractive index being greater than the cladding refractive index over a range of applied electric fields. The cladding layers may be doped with impurities of opposite conductivity types to define a doping junction which can be reverse-biased to apply relatively large electric fields across the core layer of the waveguide section.

The optical phase-modulating device is particularly useful for constructing integrated optical devices, such as Mach-Zehnder interferometers used for optical signal modulation.

Thus, another aspect of the invention provides an integrated optical device comprising an optical waveguide splitter, first and second optical waveguide devices coupled to first and second outputs of the optical waveguide splitter respectively, and an optical waveguide combiner, coupled to outputs of the first and second optical waveguide devices to produce an optical interference signal. At least one of the first and second optical waveguide devices is an optical phase-modulating device as defined above.

Another aspect of the invention provides a method for operating an optical phase-modulating device which comprises a plurality of semiconductor layers defining an optical waveguide section. The method comprises fixing electric fields across first and second parts of the optical waveguide section to fix effective optical path lengths through the first and second parts of the optical waveguide section while varying an electric field across a third part of the optical waveguide section to vary an effective optical path length through the third part of the optical waveguide section. The first and second parts of the optical waveguide section are longitudinally spaced along the optical waveguide section, and the third part of the optical waveguide section is disposed between the first and second parts of the optical waveguide section.

Conveniently, a constant electric potential may be applied between each of first and second pairs of phase-fixing electrodes disposed on opposite sides of the first and second parts of the optical waveguide section respectively to fix the electric fields across the first and second parts of the optical waveguide section. A time-varying electric potential may be applied between a pair of phase-modulating electrodes disposed on opposite sides of the third part of the optical waveguide section to vary the electric field across the third part of the optical waveguide section.

The constant electric potential applied between each of the first and second pairs of phase-fixing electrodes may be a zero potential or may be a non-zero potential for adjusting a DC phase-bias of the waveguide section.

BRIEF DESCRIPTION OF THE DRAWINGS

Embodiments of the invention are described below by way of example only, Reference is made to accompanying drawings, in which.

DESCRIPTION OF EMBODIMENTS

Figure 1:
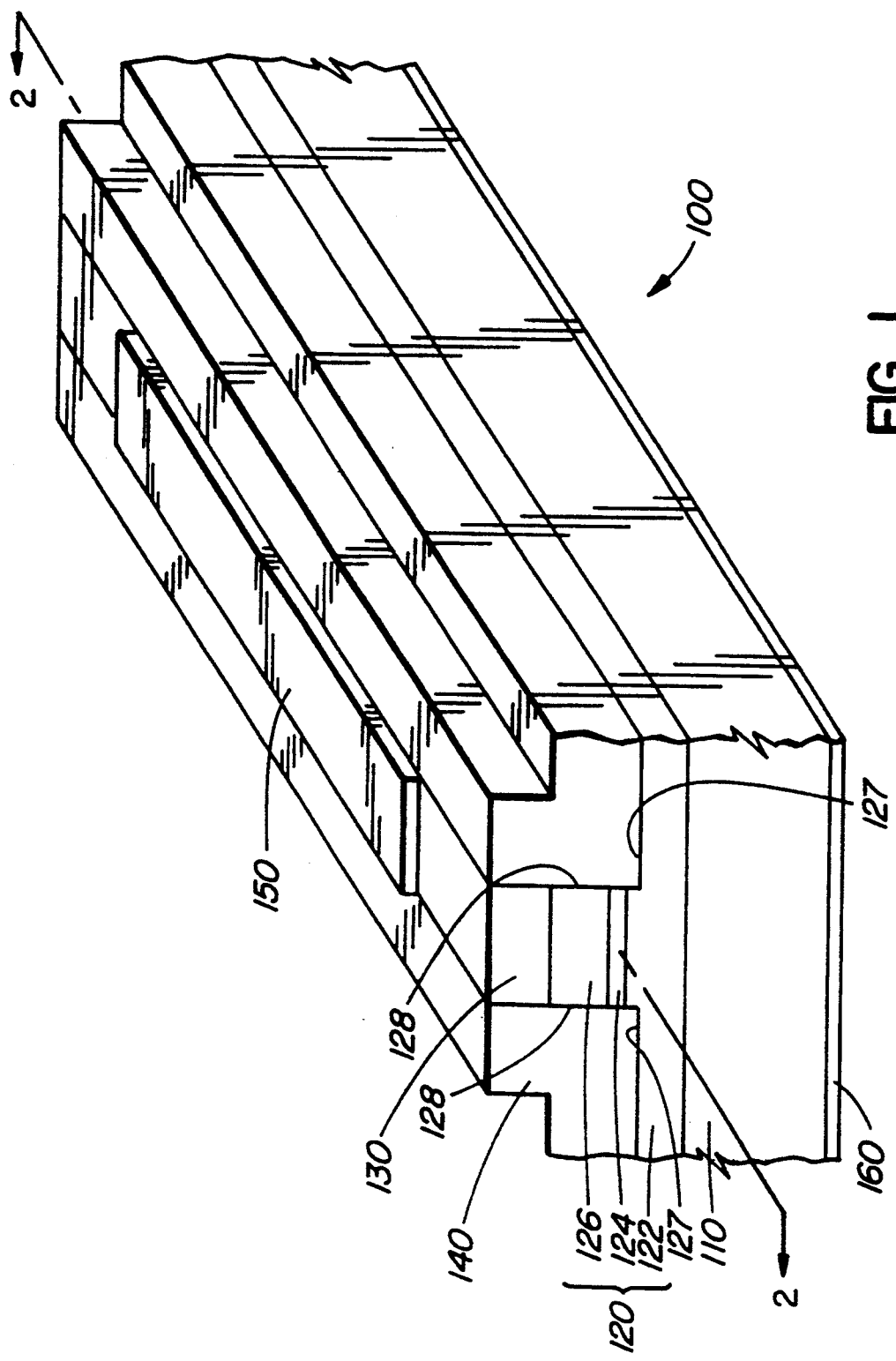
FIG. 1 is a perspective view of a known semiconductor-based optical phase-modulating device.
Figure 2:
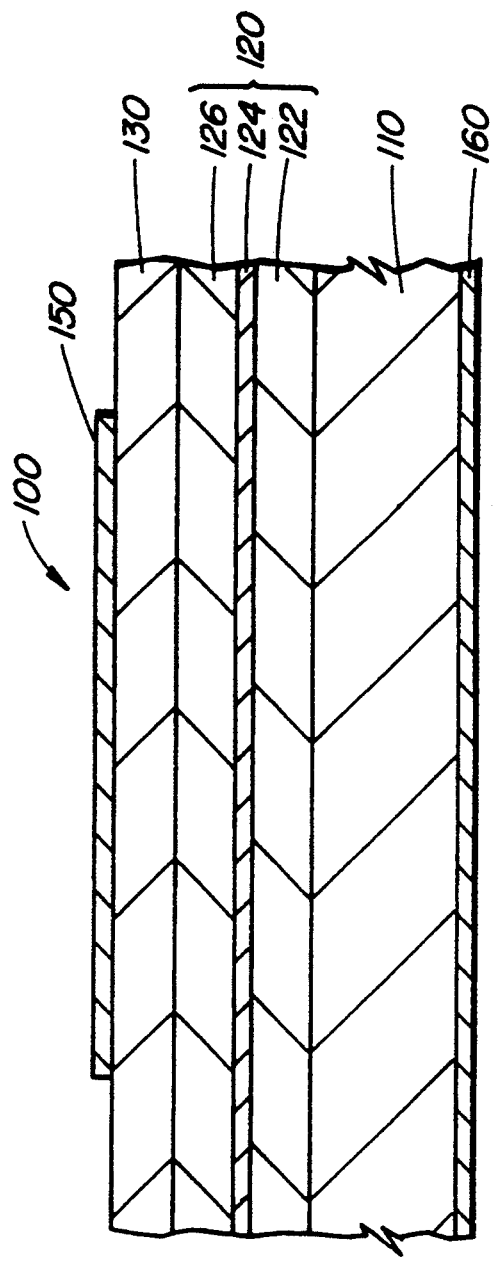
FIG. 2 is a cross-Sectional view of the phase-modulating device of FIG. 1 taken on section line 2—2 of FIG. 1.

FIGS. 1 and 2 show a known form of semiconductor-based phase-modulating device 100.

The phase-modulating device 100 is formed on a semiconductor substrate 110 and comprises a first semiconductor cladding layer 122 on the substrate 110, a semiconductor core layer 124 on the first cladding layer 122, and a second semiconductor cladding layer 126 on the core layer 124, the core and cladding layers 122, 124, 126 together defining a ridge 120 on the substrate 110. The core and cladding layers 122, 124, 126 are formed of different semiconductor compositions so that the core layer 124 has a higher refractive index than the cladding layers 122, 126 so that the ridge 120 functions as a horizontal optical waveguide section. The first cladding layer 122 has the same doping polarity as the substrate 110, and the second cladding layer 126 has an opposite doping polarity so the three layers 122, 124, 126 of the ridge 120 also define a vertical doping junction.

A semiconductor contact layer 130 covers the second cladding layer 126. The contact layer 130 is formed of a semiconductor which is heavily doped to the same doping polarity as the second cladding layer 126. A dielectric layer 140 covers an upper surface 127 of the first cladding layer 122 on both sides of the ridge waveguide section 120 and sidewalls 128 of the ridge waveguide section 120. A metallic layer 150 contacts the contact layer 130 and defines an upper phase-modulating electrode of the device 100. A metallic layer 160 on a bottom surface 114 of the substrate 110 defines a lower phase-modulating electrode of the device 100.

The device 100 is operated by applying a time-varying electric potential between the upper and lower phase-modulating electrodes while propagating light along the ridge waveguide section 120, the polarity of the electric potential being such as to reverse bias the vertical doping junction defined by the cladding layers 122, 126 and the core layer 124. The electrodes apply a time-varying electric field to the semiconductor layers 122, 124, 126, thereby modulating refractive indices of the semiconductor layers 122, 124, 126. Modulation of the refractive indices modulates the effective optical path length through the ridge waveguide section 120, thereby modulating the phase at an output end of the ridge waveguide section 120 of light propagated through the ridge waveguide section 120.

Figure 3:
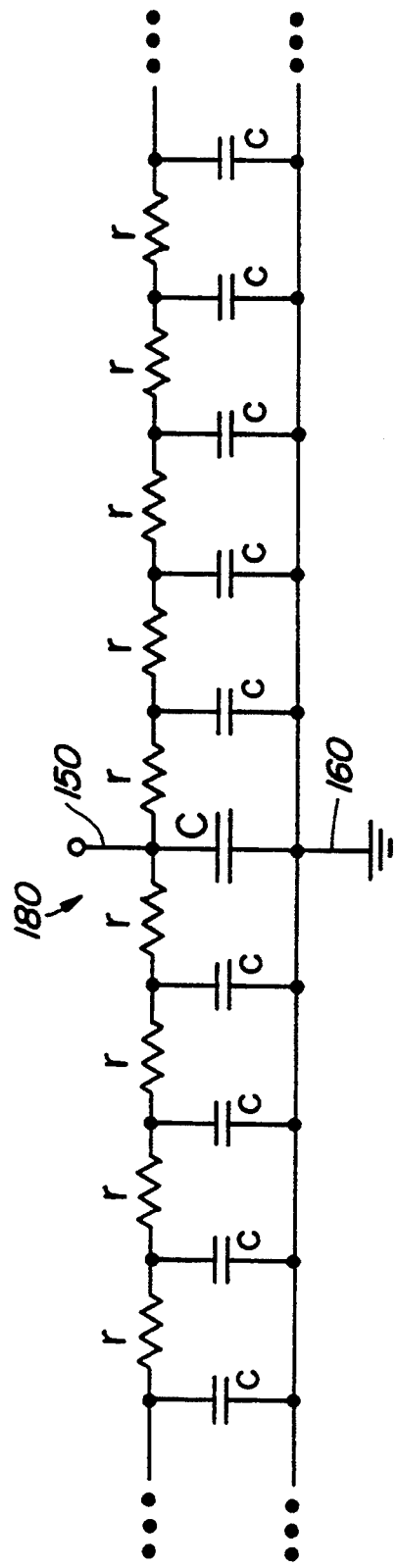
FIG. 3 is a schematic diagram of a circuit which models electrical characteristics of the phase-modulating device of FIG. 1.

The semiconductor layers 110, 122, 124, 126, 130 have a finite resistance. Consequently, electric signals applied to the phase-modulating electrodes spread along the semiconductor layers 110, 122, 124, 126, 130 beyond ends of the phase-modulating electrodes. The distributed resistance and capacitance of the semiconductor layers 110, 122, 124, 126, 130 can be modelled as a distributed RC network 180 as shown in FIG. 3, where C is the capacitance of the layers 110, 122, 124, 126, 130 under the upper phase-modulating electrode 150, and r and c are resistance and capacitance per unit length of the layers 110, 122, 124, 126, 130 beyond ends of the upper phase-modulating electrode 150. The distributed resistances r and capacitances c define a low pass filter, so that the phase-modulation provided by the phase-modulation device 100 has an undesirable frequency dependence.

Figure 4:
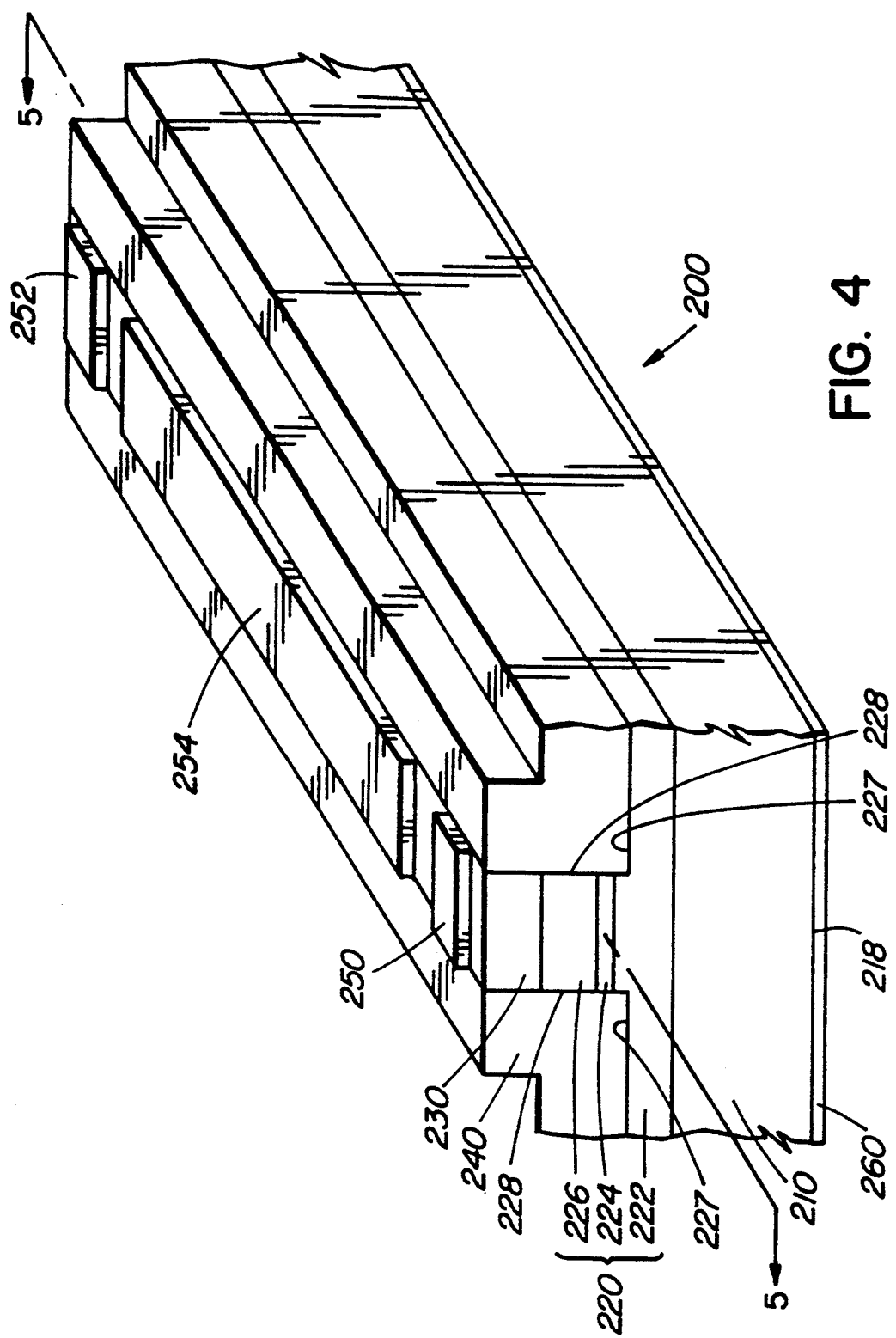
FIG. 4 is a perspective view of a semiconductor-based phase-modulating device according to an embodiment of the invention.
Figure 5:
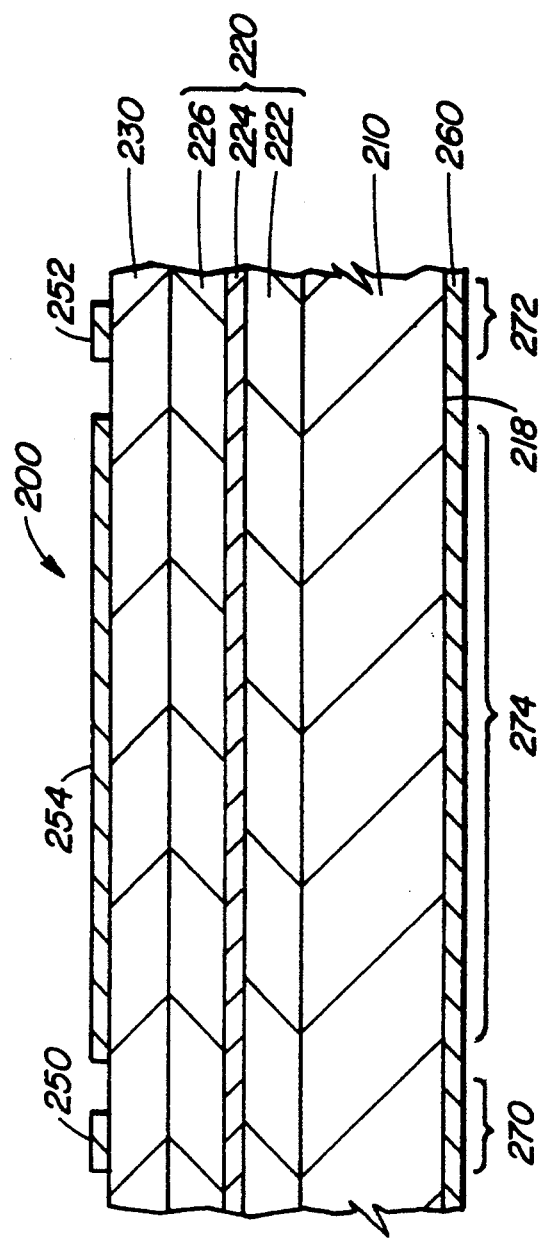
FIG. 5 is a cross-sectional view of the phase-modulating device of FIG. 4 taken on section line 5—5 of FIG. 4.

FIGS. 4 and 5 show a semiconductor-based phase-modulating device 200 according to an embodiment of the invention. This phase-modulating device 200 is formed on an n-type InP substrate 210.

The phase-modulating device 200 comprises an n-type InP cladding layer 222, an intrinsic Multiple Quantum Well (MQW) core layer 224 on the n-type cladding layer 222, and a p-type InP cladding layer 226 on the core layer 224. The MQW core layer 224 has a higher refractive index than the InP cladding layers 222, 226, so that the core and cladding layers 222, 224, 226 together define a ridge which acts as a horizontal optical waveguide section 220. The core and cladding layers 222, 224, 226 also define a vertical pin doping junction.

The phase-modulating device 200 further comprises a contact layer 230 of p-type InGaAs which covers the p-type cladding layer 226 and a dielectric layer 240 of silicon dioxide which covers an upper surface 227 of the lower cladding layer 222 on both sides of the ridge waveguide section 220 and sidewalls 228 of the ridge waveguide section 220.

The phase-modulating device 200 has three TiPtAu upper metallic layers 250, 252, 254 spaced along the ridge waveguide section 220, each contacting the contact layer 230. First and second upper metallic layers 250, 252 are 20 microns long and are spaced from opposite ends of the third upper metallic layer 254 by 20 microns, the third upper metallic layer 254 being 600 microns long.

The phase-modulating device 200 further comprises a Ni/Ge/Au/Ti/TiN/Au lower metallic layer 260 on a bottom surface 212 of the substrate 210.

The distinct upper metallic layers 250, 252, 254 define three longitudinally-spaced series-connected parts 270, 272, 274 of the waveguide section 220, each part 270, 272, 274 underlying a respective metallic layer 250, 252, 254. The first and second upper metallic layers 250, 252 define upper phase-fixing electrodes while the third upper metallic layer 254 defines an upper phase-modulating electrode. Regions of the lower metallic layer 260 beneath the first and second waveguide sections 270, 272 respectively define first and second lower phase-fixing electrodes while a region of the lower metallic layer 260 beneath the third waveguide section defines a lower phase-modulating electrode.

The phase-modulating device 200 is operated by applying a time-varying electric potential between the upper and lower phase-modulating electrodes while propagating light along the waveguide section 220, the polarity of the electric potential being such as to reverse bias the pin doping junction defined by the core and cladding layers 222, 224, 226. The phase-modulating electrodes apply a time-varying electric field across the third part of the waveguide section 220, thereby modulating refractive indices of the semiconductor layers 222, 224, 226 in the third part of the waveguide section. Modulation of the refractive indices modulates the effective optical path length through the third part of the waveguide section 220.

At the same time, a constant electric potential is applied between each upper phase-fixing electrode and its corresponding lower phase-fixing electrode to fix the electric field across the first and second parts of the waveguide section 220. This effectively limits the spread of the time-varying electric potential along the waveguide section 220 to reduce frequency dependent variation of the phase-modulation provided by the device 200.

In practice, the device 200 is operated grounding the lower metallic layer 260 and applying a constant potential with respect to ground to the first and second upper metallic layers 250, 252 while applying a time-varying potential with respect to ground to the third upper metallic layer 254 while propagating light along the waveguide section 220.

Figure 6:
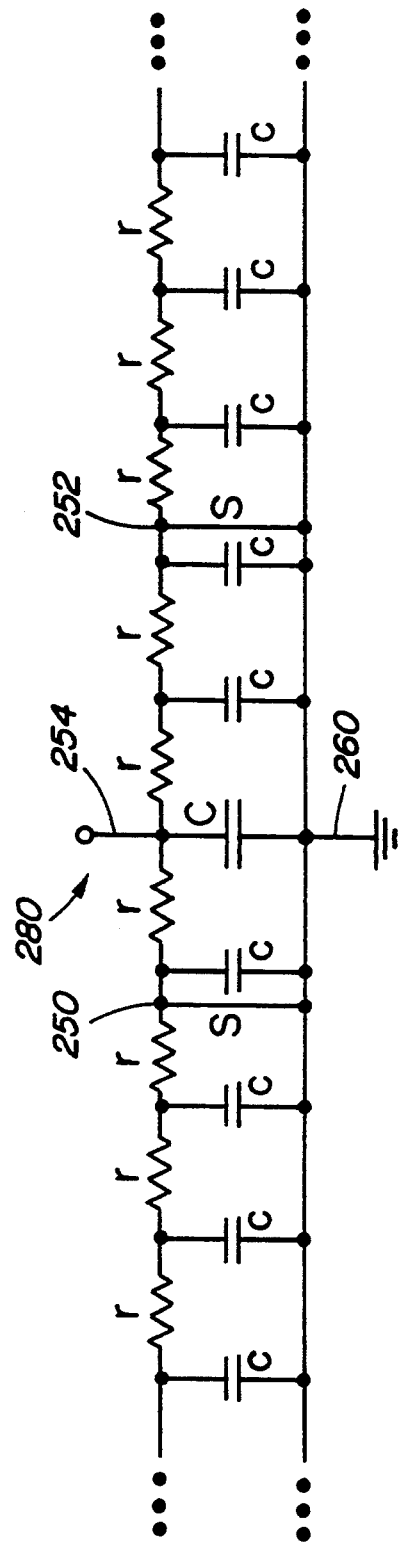
FIG. 6 is a schematic diagram of a circuit which models electrical characteristics of the phase-modulating device of FIG. 4.

Usually, the first and second upper metallic layers 250, 252 are grounded so that there is a zero potential between each pair of phase-fixing electrodes. In this case, the distributed resistance and capacitance of the semiconductor layers 210, 222, 224, 226, 230 can be modelled as a distributed RC network 280 as shown in FIG. 6. Grounding of the first and second upper metallic layers 250, 252 effectively connects shunts S across significant portions of the distributed RC network, thereby reducing undesirable frequency dependence of the phase-modulation characteristics of the device 200.

In some instances it may be advantageous to apply a non-zero DC potential between one or both pairs of phase-fixing electrodes to adjust a DC phase-bias of the waveguide section 220.

The phase-modulating device 200 can be fabricated according to conventional semiconductor device fabrication techniques. For example, the n-type cladding layer 222, the core layer 224, the p-type cladding layer 226 and the contact layer 230 are successively epitaxially grown on the substrate 210 by Organo-Metallic Vapour Phase Epitaxy (OMVPE), by Molecular Beam Epitaxy (MBE) or by other suitable epitaxial growth techniques. Typical layer thicknesses, compositions and dopings are:

| Layer | Thickness | Composition | Doping |
| --- | --- | --- | --- |
| cladding 222 | 2 microns | InP | n: $5 \times 10^{17}$ cm$^{-3}$ |
| MQW core 224 | 0.4 microns | InP/InGaAsP | intrinsic |
| cladding 226 | 2 microns | InP | p: $5 \times 10^{17}$ cm$^{-3}$ |
| contact 230 | 0.2 microns | InGaAs | p+: $10^{19}$ cm$^{-3}$ |

The MQW core layer 224 comprises 20 sublayers of InP interleaved with 20 sublayers of InGaAsP, each sublayer being 100 Angstroms thick.

The ridge waveguide section 220 is protected with a photolithographically defined mask, and unprotected regions of the contact, upper cladding and core layers 230, 226, 224, and approximately 0.3 microns thickness of the lower cladding layer 222 are removed by dry-etching to define the waveguide section 220. The waveguide section 220 is typically 2 microns wide.

The conformal silicon dioxide layer 240 is deposited to a 3 micron thickness by Plasma Enhanced Chemical Vapour Deposition (PECVD). Photoresist is spun on to define a substantially planar upper surface, and the photoresist is etched back to reveal the top of the ridge waveguide 220. The distinct layers 250, 252, 254 of TiPtAu are formed and defined using conventional liftoff techniques. The Ni/Ge/Au/Ti/TiN/Au layer 260 is then formed on the bottom surface of the substrate by successive electron beam evaporation deposition of individual metallic sublayers followed by heating to alloy the metallic layer 260.

The resistivity of the semiconductor layers of the waveguide section 220 and the spacing between the upper phase-fixing electrodes and the upper phase-modulating electrode are selected so as to achieve a desired frequency response and input impedance for the device 200. The frequency response of the device 200 can be flattened by reducing the spacing between the phase-fixing electrodes and the phase-modulating electrode. However, reducing the spacing between the phase-fixing electrodes and the phase-modulating electrode also reduces the shunting resistance between these electrodes. Consequently, there is a design tradeoff between the flatness of the frequency response and the shunting resistance. In the device described above, the shunting resistance is approximately 3000 ohms, and the 3 dB bandwidth in a 50 ohm system is approximately 15 GHz.

Figure 7:
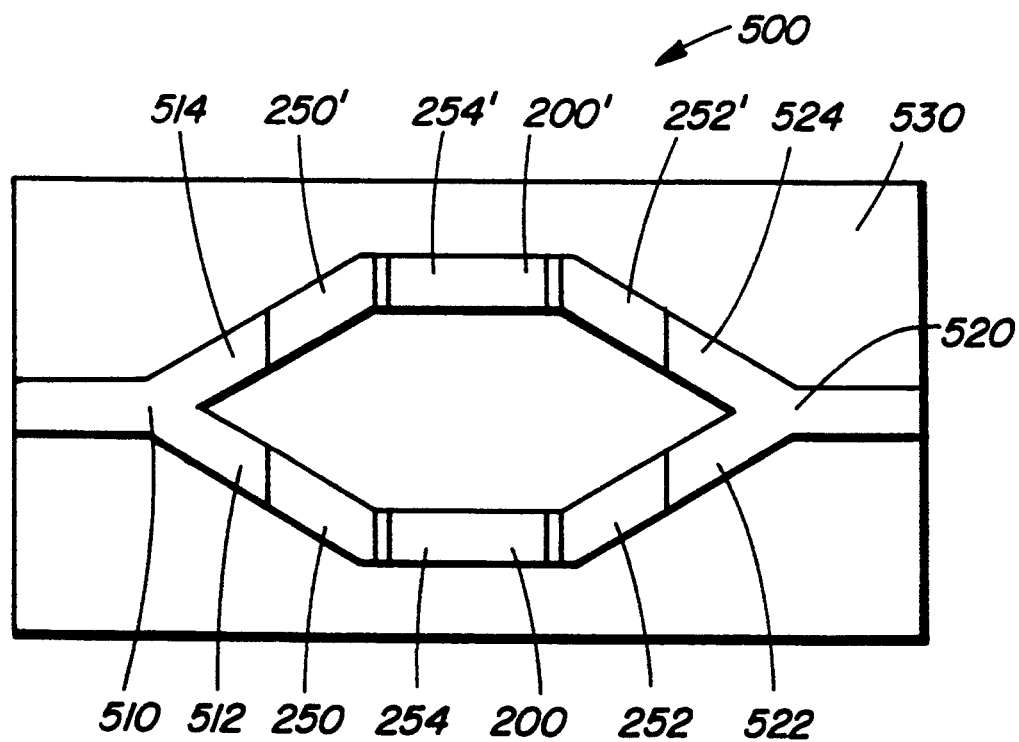
FIG. 7 is a top plan view of an integrated optic Mach-Zehnder interferometer based on a pair of phase-modulating devices similar to the device shown in FIG. 4.

The phase-modulating device 200 can be used as a basic building block in a variety of integrated optics applications. For example, the phase modulating device can be used in the construction of an integrated optic Mach-Zehnder interferometer 500 as shown in the plan view in FIG. 7.

The interferometer 500 comprises an optical waveguide splitter 510, first and second optical phase-modulating devices 200, 200' as described above, and an optical waveguide combiner 520, all formed on a common substrate 530. The first and second phase-modulating devices 200, 200' are coupled to first and second outputs 512, 514 of the waveguide splitter 510 respectively, and the waveguide combiner 520 has first and second inputs 522, 524 coupled to outputs of the first and second phase-modulating devices 200, 200' respectively, To operate the interferometer, an optical signal is launched in the waveguide splitter 510, constant potentials are applied to the phase-fixing electrodes of the phase-modulating devices 200, 200' and time-varying potentials are applied between the phase-modulating electrodes of the phase-modulating devices 200, 200'.

The waveguide splitter 510 divides the launched light into two optical signals. Differences in the time-varying potentials applied to the first and second phase-modulating devices 200, 200' result in different phase shifts as the two signals pass through the phase-modulating devices 200, 200'. The phase-shifted optical signals recombine to produce an interference signal in the waveguide combiner 520. The intensity of the interference signal depends on the difference of the phase shifts produced by the phase-modulating devices 200, 200'. The intensity is maximized at zero phase difference and minimized at a 180 degree phase difference.

Usually, the time-varying potential applied to the second phase-modulating device 200' is an inverted version of the time-varying potential applied to the first phase-modulating device 200 to minimize the AC signal amplitude required to achieve a desired modulation depth of the interference signal. Usually a zero potential is applied between all pairs of phase-fixing electrodes of both phase-modulating devices 200, 200'. However, a non-zero DC potential could be applied to the phase-fixing electrodes of one phase-modulating device to produce a DC phase difference between the two recombined signals.

One of the phase-modulating devices 200, 200' of the interferometer 500 could be replaced with a plain waveguide section. In this configuration, all phase-modulation would be provided by the single remaining phase-modulating device.

Waveguide splitters suitable for use in the interferometer 500 are described by C. Rolland et al in IEEE Photonics Technology Letters, Vol. 2, No. 6, June 1990, p.404–406, which is hereby incorporated by reference.

Numerous modifications could be made to the phase-modulating device 200 without departing from the principles of the invention.

For example, the waveguide section 220 could be a buried semi-insulating waveguide section rather than a ridge waveguide section.

Other semiconductor materials systems could be used to form the waveguides, and other conductor compositions could be used to form the electrodes.

The core layer 224 of the waveguide section 220 could be a single InGaAsP layer instead of a MQW layer comprising multiple sublayers of alternating compositions. However, this modification would degrade the high frequency performance of the device 200.

The lower metallic layer 260 could be divided into distinct electrode regions to provide increased flexibility in biasing the phase-modulating device 200.

These and other modifications are within the scope of the invention as claimed below.

We claim:

1. An optical phase-modulating device, comprising:
   a plurality of semiconductor layers defining an optical waveguide section, the optical waveguide section having first and second longitudinally spaced parts and a third part disposed between the first and second parts;
   a first pair of phase-fixing electrodes disposed adjacent the first part of the optical waveguide section for fixing an electric field in a predetermined direction across the first part of the optical waveguide section to fix an effective optical path length through the first part of the optical waveguide section;
   a second pair of phase-fixing electrodes disposed adjacent the second part of the optical waveguide section for fixing an electric field in said predetermined direction across the second part of the optical waveguide section to fix an effective optical path length through the second part of the optical waveguide section; and
   a pair of phase-modulating electrodes disposed adjacent the third part of the optical waveguide section for applying a variable electric field in said predetermined direction across the third part of the optical waveguide section to vary an effective optical path length through the third part of the optical waveguide section.

2. An optical phase-modulating device as defined in claim 1, wherein at least one electrode of each of the first and second pairs of phase-fixing electrodes is spaced from a respective end of a corresponding electrode of the pair of phase-modulating electrodes by a distance which is much shorter than the corresponding electrode of the pair of phase-modulating electrodes.

3. An optical phase-modulating device as defined in claim 1, wherein the semiconducting layers defining the optical waveguide section comprise a pair of cladding layers having a cladding refractive index and a core layer having a core refractive index, the core layer being disposed between the cladding layers and the core refractive index being greater than the cladding refractive index over a range of applied electric fields.

4. An optical phase-modulating device as defined in claim 3, wherein the core and cladding layers define a ridge waveguide section.

5. An optical phase-modulating device as defined in claim 4, wherein sidewalls of the ridge waveguide section form an interface with a dielectric layer.

6. An optical phase-modulating device as defined in claim 5, wherein:
   the semiconductor layers defining the ridge waveguide comprise an n-type InP cladding layer on an n-type InP substrate, an intrinsic Multiple Quantum Well (MQW) core layer on the n-type InP cladding layer and a p-type InP cladding layer on the intrinsic MQW core layer; and
   each pair of electrodes comprises a common Ni/Ge/Au/Ti/TiN/Au layer on a bottom surface of the n-type InP substrate, a common p-type InGaAs contact layer on an upper surface of the ridge waveguide and distinct TiPtAu layers on the p-type InGaAs contact layer, the distinct TiPtAu defining the first, second and third parts of the waveguide section.

7. An optical phase-modulating device as defined in claim 6, wherein the Multiple Quantum Well core layer comprises a plurality of InGaAsP sublayers interleaved with a plurality of InP sublayers.

8. An optical phase-modulating device as defined in claim 3, wherein one of the cladding layers is doped with n-type impurities and the other of the cladding layers is doped with p-type impurities.

9. An optical phase-modulating device as defined in claim 8, wherein the at least one electrode of each pair of electrodes comprises a metallic layer.

10. An optical phase-modulating device as defined in claim 9, further comprising a heavily doped semiconductor contact layer between one of the cladding layers and the metallic layer.

11. An integrated optical device, comprising:
an optical waveguide splitter;
first and second optical waveguide devices coupled to first and second outputs of the optical waveguide splitter respectively, at least one of the optical waveguide devices comprising an optical phase-modulating device as defined in claim 1; and
an optical waveguide combiner, coupled to outputs of the first and second optical waveguide devices to produce an optical interference signal.

12. A method for operating an optical phase-modulating device comprising a plurality of semiconductor layers defining an optical waveguide section, the optical waveguide section having first and second parts spaced in a direction of light propagation along the optical waveguide section and a third part disposed between the first and second parts, the method comprising fixing electric fields across the first and second parts of the optical waveguide section to fix effective optical path lengths through the first and second parts of the optical waveguide section while varying an electric field across the third part of the optical waveguide section to vary an effective optical path length through the third part of the optical waveguide section.

13. A method for operating an optical phase-modulating device comprising a plurality of semiconductor layers defining an optical waveguide section, the optical waveguide section having first and second parts spaced in a direction of light propagation along the optical waveguide section and a third part disposed between the first and second parts, the method comprising applying a constant electric potential between each of first and second pairs of phase-fixing electrodes disposed on opposite sides of the first and second parts of the optical waveguide section respectively to fix electric fields across the first and second parts of the optical waveguide section to fix effective optical path lengths through the first and second parts of the optical waveguide section while applying a time-varying electric potential between a pair of phase-modulating electrodes disposed on opposite sides of the third part of the optical waveguide section to vary the electric field across the third part of the optical waveguide section to vary an effective optical path length through the third part of the optical waveguide section.

14. A method as defined in claim 13, wherein the electric potential applied between each of the first and second pairs of phase-fixing electrodes is a zero potential.

15. A method as defined in claim 13, wherein the electric potential applied between each of the first and second pairs of phase-fixing electrodes is a non-zero potential for adjusting a DC phase-bias of the waveguide section.

* * * * *